(12) United States Patent
Morimoto et al.

(10) Patent No.: US 11,697,190 B2
(45) Date of Patent: Jul. 11, 2023

(54) CLAMPING DEVICE AND WORKPIECE CLAMPING METHOD

(71) Applicant: HONDA MOTOR CO., LTD., Tokyo (JP)

(72) Inventors: Taisuke Morimoto, Tokyo (JP); Yosuke Ikadai, Tokyo (JP); Kazuma Nakayama, Tokyo (JP); Tohru Takamura, Tokyo (JP); Ryunosuke Hozawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/672,763

(22) Filed: Feb. 16, 2022

(65) Prior Publication Data
US 2022/0288750 A1    Sep. 15, 2022

(30) Foreign Application Priority Data

Mar. 10, 2021   (JP) ................................. 2021-038706

(51) Int. Cl.
| B25B 5/12 | (2006.01) |
| B62D 65/02 | (2006.01) |
| B25B 5/00 | (2006.01) |
| B25B 5/02 | (2006.01) |
| B25B 5/16 | (2006.01) |
| B25B 5/14 | (2006.01) |

(52) U.S. Cl.
CPC ................ *B25B 5/12* (2013.01); *B25B 5/003* (2013.01); *B25B 5/02* (2013.01); *B25B 5/163* (2013.01); *B62D 65/026* (2013.01); *B25B 5/006* (2013.01); *B25B 5/14* (2013.01)

(58) Field of Classification Search
CPC .. B25B 5/12; B25B 5/003; B25B 5/02; B25B 5/163; B25B 5/006; B25B 5/14; B62D 65/026
See application file for complete search history.

(56) References Cited

U.S. PATENT DOCUMENTS

| 3,302,943 | A | * | 2/1967 | Mericle, Jr. | ............. | B25B 5/122 |
| | | | | | | 269/94 |
| 3,614,151 | A | * | 10/1971 | Shadle | ..................... | B66C 1/447 |
| | | | | | | 294/197 |
| 11,364,593 | B2 | * | 6/2022 | Jacobson | ................... | B25B 5/02 |

FOREIGN PATENT DOCUMENTS

JP   04-035893   2/1992

* cited by examiner

*Primary Examiner* — Ryan J. Walters
(74) *Attorney, Agent, or Firm* — Amin, Turocy & Watson, LLP

(57) ABSTRACT

A clamping device includes a cylinder, a base body, a movable plate, and holding pins. The movable plate is attached to the base body substantially parallel thereto via two pairs of link arms. The movable plate moves along the operating direction of the cylinder. The movable plate can abut against a width-direction side surface of a workpiece. The holding pins are attached to the movable plate. The holding pins abut against an upper portion of the workpiece.

4 Claims, 6 Drawing Sheets

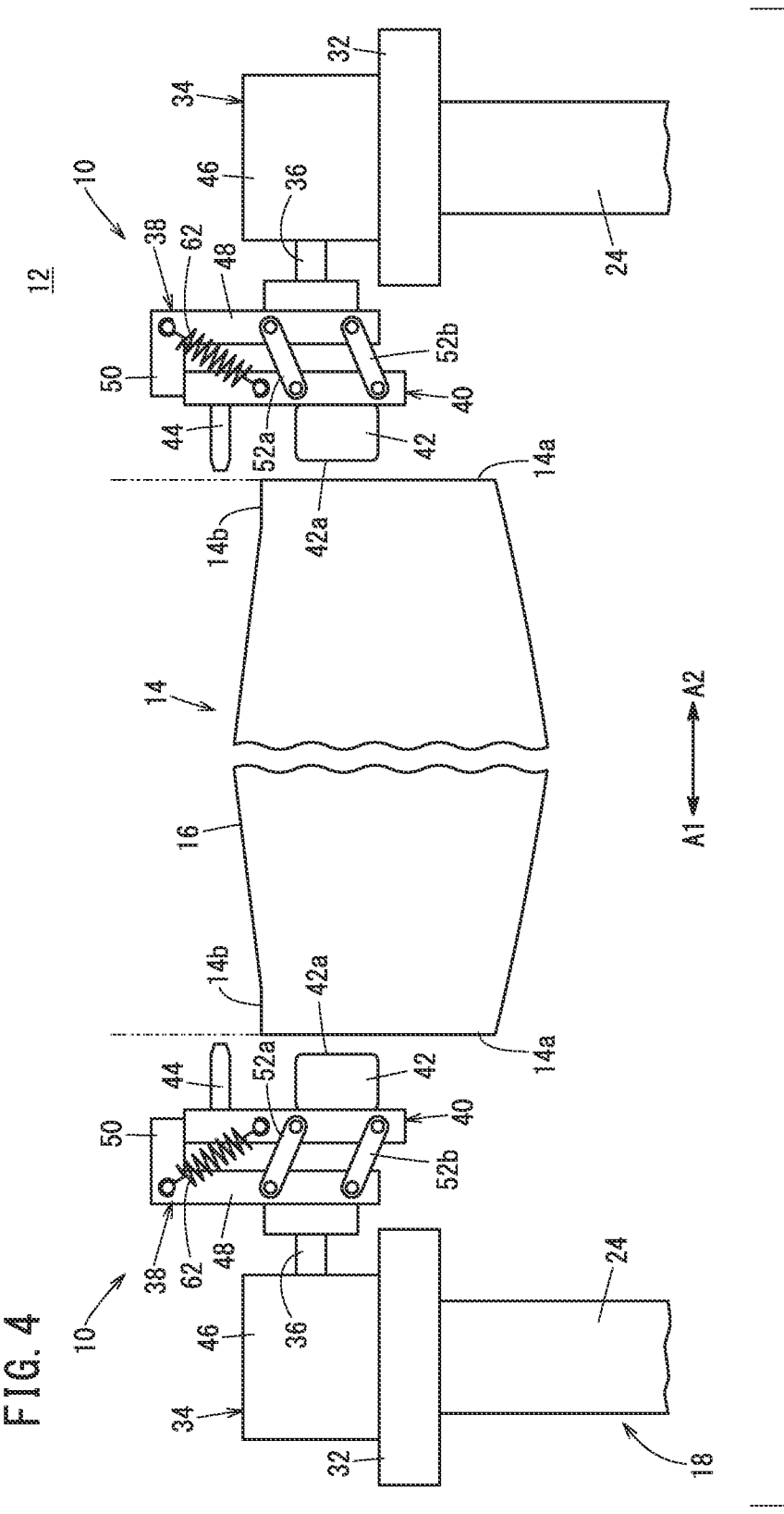

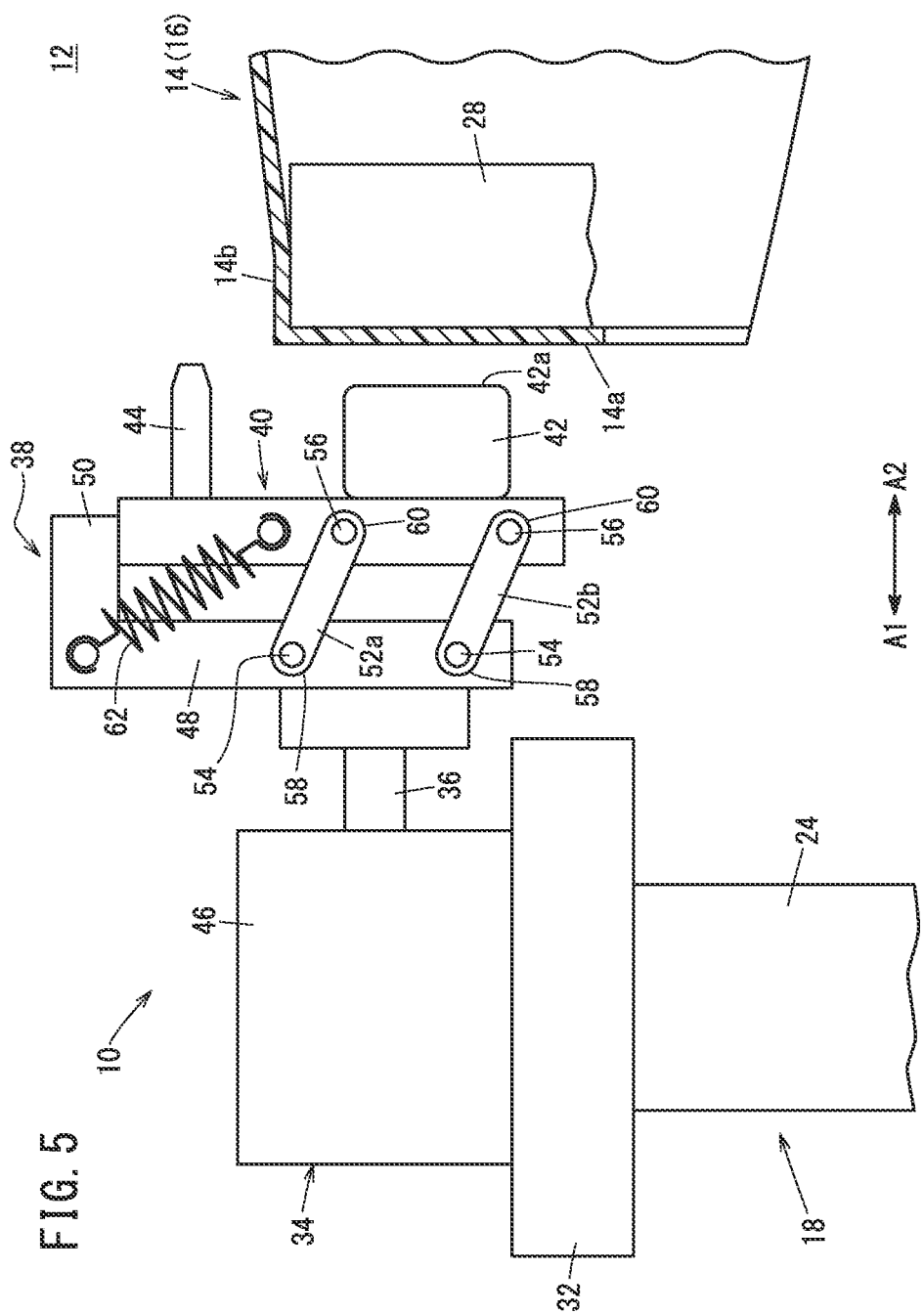

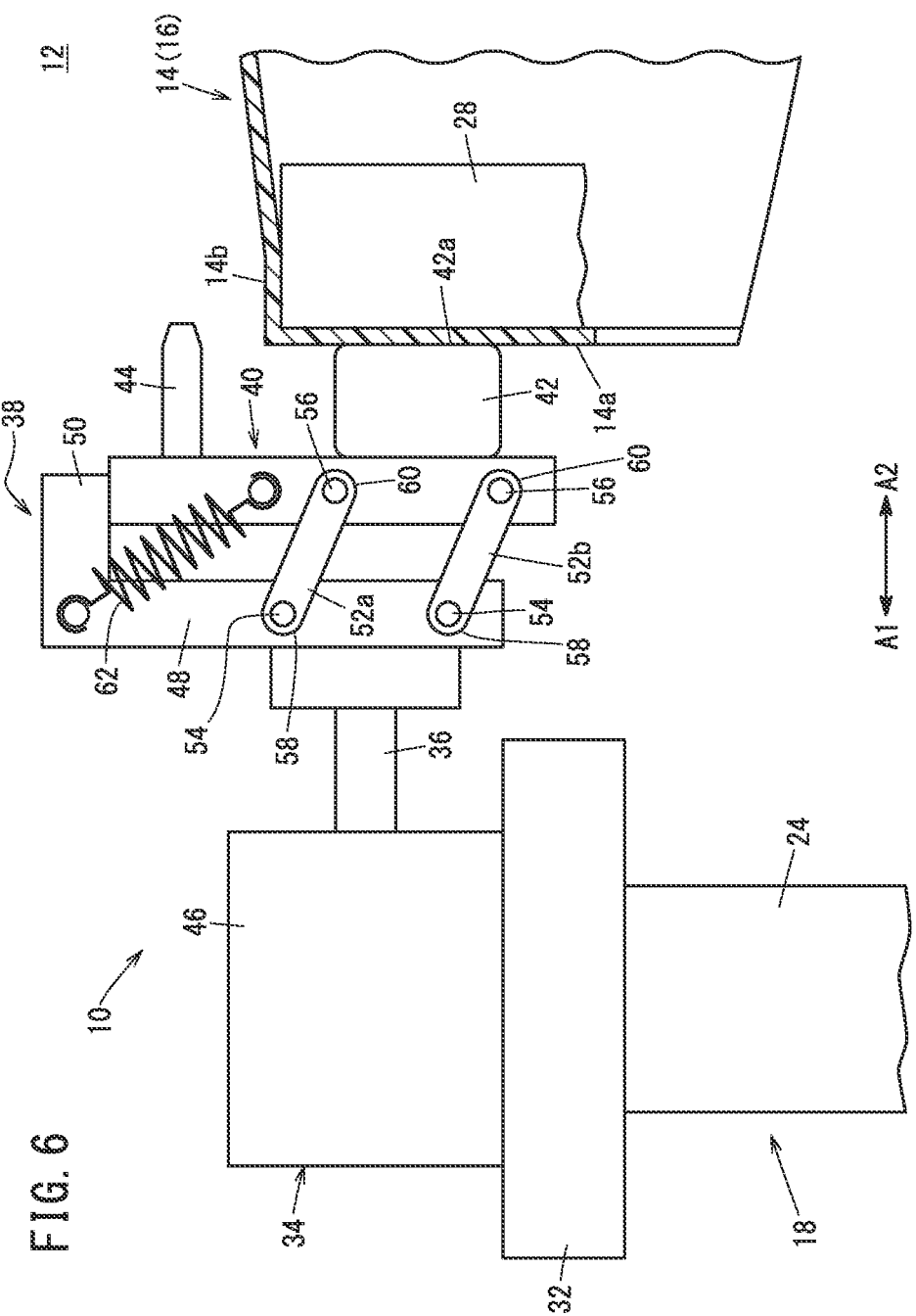

CLAMPING DEVICE AND WORKPIECE CLAMPING METHOD

CROSS-REFERENCE TO RELATED APPLICATIONS

This application is based upon and claims the benefit of priority from Japanese Patent Application No. 2021-038706 filed on Mar. 10, 2021, the contents of which are incorporated herein by reference.

BACKGROUND OF THE INVENTION

Field of the Invention

The present invention relates to a clamping device for fixing a workpiece and a workpiece clamping method.

Description of the Related Art

Conventionally, an instrument panel is used in a vehicle interior of an automobile. A skin material is sewn on the surface of the instrument panel using a sewing apparatus. In the sewing process of this sewing apparatus, the instrument panel is positioned from below by a jig or the like and fixed by a holding unit. Thereafter, the skin material is sewn on the surface of the instrument panel.

The trimming apparatus disclosed in JP H04-035893 A includes a positioning unit, a pressing unit, and a moving unit. The positioning unit positions an instrument panel which is a molded article. The pressing unit presses and supports the molded article toward the positioning unit. The moving unit moves the pressing unit toward and away from the molded article.

The trimming apparatus operates as follows. First, a positioning jig of the positioning unit is inserted from below a molded body. The molded body is supported by the positioning jig. A skin sheet is joined to the surface of the molded body. Next, a pressing jig of the pressing unit is brought into contact with and pressed against the skin sheet. After the molded body is fixed by the pressing unit, water is sprayed from a nozzle of a jet processing machine. A desired part of the skin sheet is cut with the sprayed water. In the instrument panel, the skin sheet joined surface is a design surface.

SUMMARY OF THE INVENTION

For example, when the pressing unit disclosed in JP H04-035893 A is applied to a sewing apparatus, the pressing jig of the pressing unit presses the skin sheet of the instrument panel. Therefore, when a plurality of portions of the skin sheet are pressed and supported by the pressing jig, a sewing mechanism interferes with the pressing jig when performing sewing. As a result, the skin sheet cannot be sewn by the sewing mechanism.

Further, a drive mechanism for driving the positioning unit and a drive mechanism for driving the pressing unit are separate drive mechanisms. As a result, the number of components of the sewing apparatus increases, whereby the configuration becomes complicated, and the manufacturing cost of the sewing apparatus increases.

An object of the present invention is to solve the above-described problems.

According to an aspect of the present invention, provided is a clamping device that positions and fixes a workpiece, the clamping device comprising: a cylinder configured to move forward and backward relative to the workpiece; a base body attached to a tip of the cylinder; a first clamping member attached to the base body substantially parallel to the base body via at least one pair of link arms, the first clamping member including an abutting surface configured to abut against a first surface of the workpiece in an operating direction of the cylinder; and a second clamping member attached to the first clamping member and extending in a direction orthogonal to the abutting surface, wherein one end of each of the link arms is pivotally supported by the base body, and another end of each of the link arms is pivotally supported by the first clamping member, and when the first clamping member abuts against the workpiece and each of the link arms is tilted in a manner that the another end approaches the base body, the second clamping member moves in a direction orthogonal to the operating direction and abuts against a second surface of the workpiece that is substantially orthogonal to the first surface.

According to the present invention, the clamping device includes the first and second clamping members that can be moved toward and brought into abutment against the first and second surfaces of the workpiece. The first and second clamping members are drivable by a driving force from a single cylinder. Thus, the workpiece can be simultaneously and reliably held from two directions by the clamping device. The manufacturing cost can be reduced by simplifying the configuration of the clamping device.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a partially omitted overall front view showing a state in which a clamped state of the instrument panel by the clamping device is released in the sewing apparatus of FIG. 2;

FIG. 5 is an enlarged front view of the vicinity of the clamping device in the sewing apparatus of FIG. 4; and FIG. 6 is an enlarged front view showing a state in which a buffer member of the clamping device of FIG. 5 abuts against the instrument panel.

DESCRIPTION OF THE INVENTION

Figure 1:
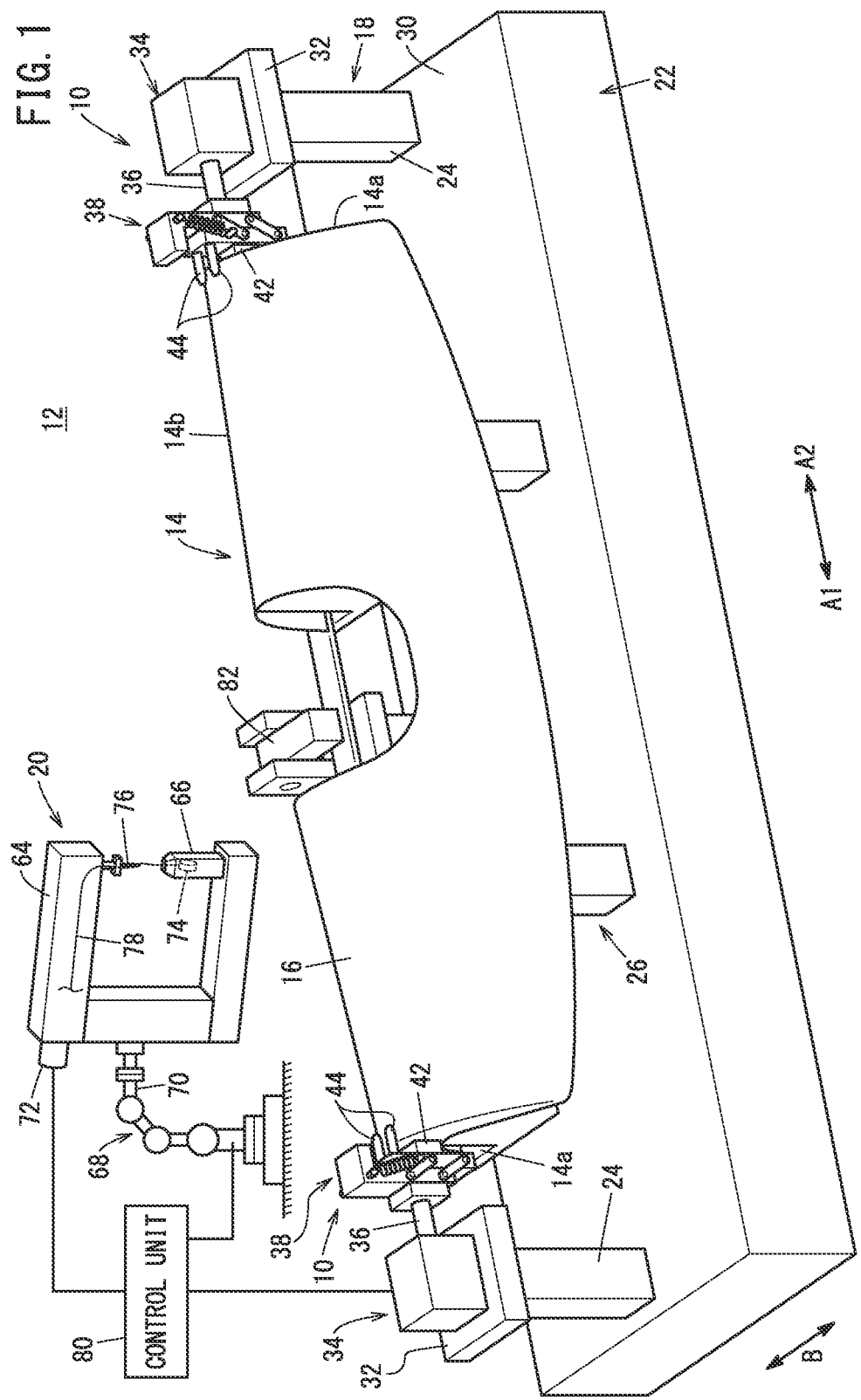
FIG. 1 is an overall perspective view of a sewing apparatus including a clamping device according to an embodiment of the present invention.

A clamping device 10 shown in FIG. 1 is used in a sewing apparatus 12. The sewing apparatus 12 sews a skin material 16 on a surface of a workpiece 14 that is an object to be sewn. In the present embodiment, the workpiece 14 is an instrument panel. The sewing apparatus 12 includes a holding mechanism 18 and a sewing mechanism 20. The holding mechanism 18 holds the workpiece 14. The sewing mechanism 20 forms stitches on the workpiece 14. The workpiece 14 is a hollow laminate in which the skin material 16 is laminated on a base material (not shown).

In the following description, as shown in FIG. 1, a longitudinal direction of the instrument panel as the workpiece 14 is a vehicle width direction when the instrument panel is mounted on a vehicle. The longitudinal direction is defined as a width direction (directions of arrows A1 and A2).

The holding mechanism 18 includes a base 22 and a pair of clamping devices 10. The clamping devices 10 are disposed on support columns 24 erected on the base 22. The clamping device 10 can switch a holding state (clamping state) of the workpiece 14. The base 22 includes a plurality of lifting cylinders 26. Each of the lifting cylinders 26 includes a lifting rod serving as an advancing/retracting member that moves up or down. The plurality of lifting cylinders 26 are disposed at intervals in the width direction of the base 22 (the directions of arrows A1 and A2). Each of the lifting cylinders 26 includes an inner jig 28 (see FIG. 3). The inner jig 28 is disposed at an upper end of the lifting cylinder 26. The inside of the workpiece 14 is positioned and held by the plurality of inner jigs 28.

The base 22 includes a base portion 30 and the support columns 24. The base portion 30 is placed on and supported by the upper surface of the base 22. The support columns 24 are erected on the base portion 30. The support columns 24 hold the workpiece 14. The support columns 24 are disposed at three locations including left and right end portions of the base 22 along the width direction (the directions of arrows A1 and A2) and a central portion of the base 22 in the width direction. An upper end of each of the support columns 24 includes a mounting portion 32. The mounting portion 32 is wide in the horizontal direction.

As shown in FIGS. 1 to 6, the pair of clamping devices 10 are mounted on the pair of support columns 24 respectively disposed at the left end portion and the right end portion of the base 22 along the width direction (the directions of arrows A1 and A2). The clamping devices 10 each include a cylinder 34, a base body 38, a movable plate (first clamping member) 40, a buffer member 42, and holding pins (second clamping member) 44. The cylinder 34 is fixed to an upper surface of the mounting portion 32 of the support column 24. The base body 38 is attached to a distal end of a rod 36 of the cylinder 34. The movable plate 40 is attached to the base body 38 so as to be relatively movable by two pairs of link arms 52a and 52b. The buffer member 42 is attached to an end face of the movable plate 40 that faces the workpiece 14. The holding pins 44 are attached to an upper end of the movable plate 40. One clamping device 10 at the left end portion of the base 22 and the other clamping device 10 at the right end portion of the base 22 are disposed symmetrically with respect to the center of the base 22 in the width direction.

The cylinder 34 includes a body 46 and the rod 36. A lower surface of the body 46 is fixed to the upper surface of the mounting portion 32. Compressed air is supplied to the inside of the body 46 from a compressed air supply unit (not shown).

By supplying a pressure fluid to the inside of the body 46, the rod 36 moves forward and backward in an axial direction (the directions of arrows A1 and A2, an operating direction). The rod 36 is disposed so as to face the workpiece 14. The rod 36 extends along the width direction of the base 22. By supplying a fluid such as compressed air to the body 46, the rod 36 can move from the body 46 toward the workpiece 14.

The cross-sectional shape of the base body 38 is an L shape. The base body 38 includes a main body portion 48 and a protruding portion 50. The main body portion 48 extends in an up-down direction orthogonal to the movement direction of the rod 36 of the cylinder 34. The protruding portion 50 is disposed at an upper end of the main body portion 48. The protruding portion 50 protrudes in the movement direction of the rod 36 (the width direction of the base 22). The protruding portion 50 protrudes in a direction away from the rod 36.

A lower end portion of the main body portion 48 abuts against the distal end of the rod 36 and is connected by a bolt or the like (not shown). The base body 38 is connected at a position shifted upward from the rod 36.

The base body 38 has an axial end face to which the rod 36 is fixed. The base body 38 has both side surfaces along a horizontal direction (arrow B direction in FIG. 1) orthogonal to the axial end face. The two pairs of link arms 52a and 52b are pivotally supported on the both side surfaces of the base body 38.

Each of the link arms 52a and 52b has a plate shape elongated in the longitudinal direction. The link arm 52a and the link arm 52b are separated from each other by a predetermined distance in the up-down direction of the base body 38 (the direction in which the main body portion 48 extends). The link arm 52a and the link arm 52b are parallel to each other.

Figure 3:
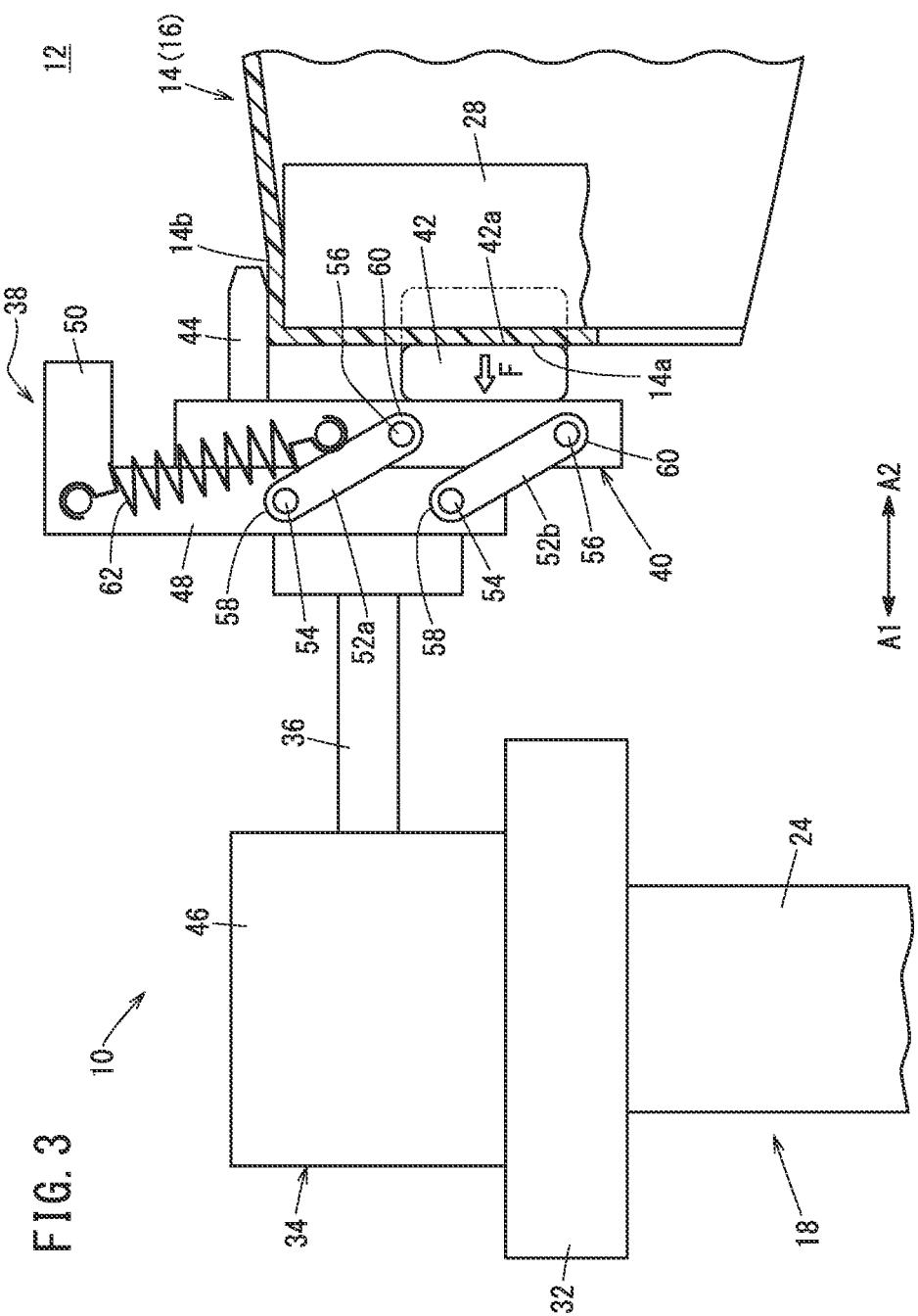
FIG. 3 is an enlarged front view of the vicinity of the clamping device in the sewing apparatus of FIG. 2.

As shown in FIG. 3, one end 58 of the link arm 52a along the longitudinal direction and one end 58 of the link arm 52b along the longitudinal direction are supported on the side surface of the base body 38 by first support shafts 54. One pair of link arms 52a and 52b are supported on one side surface of the base body 38. Another pair of link arms 52a and 52b are supported on the other side surface of the base body 38.

As a result, the one ends 58 of the two pairs of link arms 52a and 52b are tiltably supported on the both side surfaces of the base body 38 via the first support shafts 54.

The movable plate 40 is a plate member having a constant thickness. The movable plate 40 is disposed substantially parallel to the main body portion 48 of the base body 38. The movable plate 40 faces the main body portion 48 on the opposite side of the main body portion 48 to the cylinder 34. The movable plate 40 is separated from the workpiece 14 by a predetermined distance in the width direction. The movable plate 40 has an end face facing the base body 38. Second support shafts 56 are attached to both side surfaces of the movable plate 40 in the horizontal direction that are orthogonal to the end face of the movable plate 40. Other ends 60 of the two pairs of link arms 52a and 52b are supported on the both side surfaces of the movable plate 40 via the second support shafts 56.

As a result, the other ends 60 of the two pairs of link arms 52a and 52b are tiltably supported on the both side surfaces of the movable plate 40 via the second support shafts 56.

The two pairs of link arms 52a and 52b are pivotally supported on the side surfaces of the base body 38 and the side surfaces of the movable plate 40, respectively. The movable plate 40 is held substantially parallel to the base body 38 via the link arms 52a and 52b. The movable plate 40 is movable relative to the base body 38.

The other ends 60 of the two pairs of link arms 52a and 52b are disposed below the one ends 58 of the link arms 52a and 52b. The link arms 52a and 52b are disposed to be inclined downward at a predetermined angle from the one ends 58 toward the other ends 60.

A spring 62 is attached in the vicinity of the upper end of the movable plate 40. The spring 62 is a resilient member. The spring 62 is interposed between the vicinity of the upper end of the movable plate 40 and the protruding portion 50 of the base body 38. The spring 62 is a tension coil spring. One end of the spring 62 is locked to the movable plate 40. The other end of the spring 62 is locked to the protruding portion 50 of the base body 38. The spring force of the spring 62 biases the upper end of the movable plate 40 toward the protruding portion 50 of the base body 38.

As a result, in a state in which clamping of the workpiece 14 by the clamping device 10 is released as shown in FIGS. 4 and 5, the movable plate 40 is constantly biased by the spring force of the spring 62 in the direction approaching the protruding portion 50.

In other words, the movable plate 40 is biased obliquely upward by the spring force of the spring 62 so as to abut against the protruding portion 50. The movable plate 40 is maintained at a position separated from the base body 38 toward the workpiece 14 by a predetermined distance via the two pairs of link arms 52a and 52b.

When the movable plate 40 abuts against the protruding portion 50, the other ends 60 of the two pairs of link arms 52a and 52b are disposed below the one ends 58 of the link arms 52a and 52b. The link arms 52a and 52b are adjusted so as to be inclined at a predetermined angle so that the other ends 60 of the link arms 52a and 52b are disposed below the one ends 58.

The buffer member 42 is made of an elastic resin material and is formed in a block shape. The buffer member 42 is mounted on the end face of the movable plate 40 that faces the workpiece 14. The buffer member 42 protrudes from the end face of the movable plate 40 toward the workpiece 14. When the movable plate 40 moves toward the workpiece 14, an end face (abutting surface) 42a of the buffer member 42 abuts against a width-direction side surface (first surface) 14a of the workpiece 14. Thus, the width-direction side surface 14a of the workpiece 14 is held by the movable plate 40 via the buffer member 42. An impact generated when the width-direction side surface 14a of the workpiece 14 is held by the movable plate 40 is suitably absorbed by the buffer member 42.

The end face (abutting surface) 42a of the buffer member 42 is a low friction surface. When the workpiece 14 abuts against the buffer member 42, the workpiece 14 easily slides on the end face (abutting surface) 42a of the buffer member 42. Therefore, the workpiece 14 is prevented from being damaged when the workpiece 14 and the buffer member 42 abut against each other.

The holding pins 44 face the workpiece 14 at the upper end of the movable plate 40. The holding pins 44 protrude by a predetermined length from the movable plate 40 toward the workpiece 14. The holding pins 44 are fixed to the movable plate 40. The holding pins 44 are substantially parallel to the movement direction of the rod 36. A pair of the holding pins 44 are disposed at a predetermined distance from each other in the horizontal direction (the arrow B direction in FIG. 1) of the movable plate 40.

When the cylinder 34 is driven to move the movable plate 40 toward the workpiece 14, the holding pins 44 are lowered toward an upper portion (second surface) 14b of the workpiece 14. The holding pins 44 are lowered and abut against the upper portion 14b of the workpiece 14. The holding pins 44 can press the upper portion 14b of the workpiece 14 downward.

As shown in FIG. 1, the sewing apparatus 12 includes a casing 64 and a post bed 66. The casing 64 has a U-shape in a side view seen from the width direction of the sewing apparatus 12. The casing 64 is connected to a tip arm 70 of a sewing robot 68. The post bed 66 is attached to the casing 64. A looper 74 is housed inside the post bed 66. The looper 74 rotates when driven by a sewing motor 72. The looper 74 has a hook-shaped latching claw (not shown). A thread 78 passed through the hole of a sewing machine needle 76 is hooked to the latching claw. In the sewing apparatus 12, the holding mechanism 18, the sewing mechanism 20, and the sewing robot 68 are electrically connected to a control unit 80.

Next, a case where the workpiece 14 is positioned and fixed to the base 22 by the clamping devices 10 will be described.

First, the clamping state of the clamping devices 10 shown in FIGS. 4 and 5 is released. The lifting cylinders 26 are lifted to bring the inner jigs 28 into abutment against the inner surface of the workpiece 14. One clamping device 10 faces the width-direction side surface 14a at the left end of the workpiece 14 along the width direction. The other clamping device 10 faces the width-direction side surface 14a at the right end of the workpiece 14 along the width direction.

Specifically, the end faces 42a of the buffer members 42 in the clamping devices 10 face the width-direction side surfaces 14a of the workpiece 14. The end face 42a of the buffer member 42 and width-direction side surface 14a of the workpiece 14 are separated from each other by a predetermined distance. The holding pins 44 are separated upward from the upper portion 14b of the workpiece 14 by a predetermined distance. The holding pins 44 are disposed so as to be separated outward in the width direction from the width-direction side surface 14a of the workpiece 14.

Next, a compressed air supply source (not shown) is driven based on a control signal from the control unit 80. When the compressed air supply source is driven, compressed air is supplied from the compressed air supply source to the cylinder 34 of the clamping device 10. As shown in FIG. 6, the rod 36 of the cylinder 34 advances toward the workpiece 14 by the compressed air. As the rod 36 advances, the base body 38 integrally moves toward the workpiece 14. As a result, the movable plate 40 moves toward the workpiece 14 together with the base body 38. The movable plate 40 moves inward in the width direction of the sewing apparatus 12. At this time, the movable plate 40 is biased obliquely upward by the spring force of the spring 62. Since the movable plate 40 moves and abuts against the protruding portion 50 of the base body 38 at this time, the movable plate 40 and the base body 38 do not move relative to each other. The movable plate 40 and the base body 38 are maintained so as to be separated from each other by a predetermined distance in the width direction of the workpiece 14 (the directions of arrows A1 and A2). The movable plate 40 and the base body 38 integrally move toward the workpiece 14.

Figure 2:
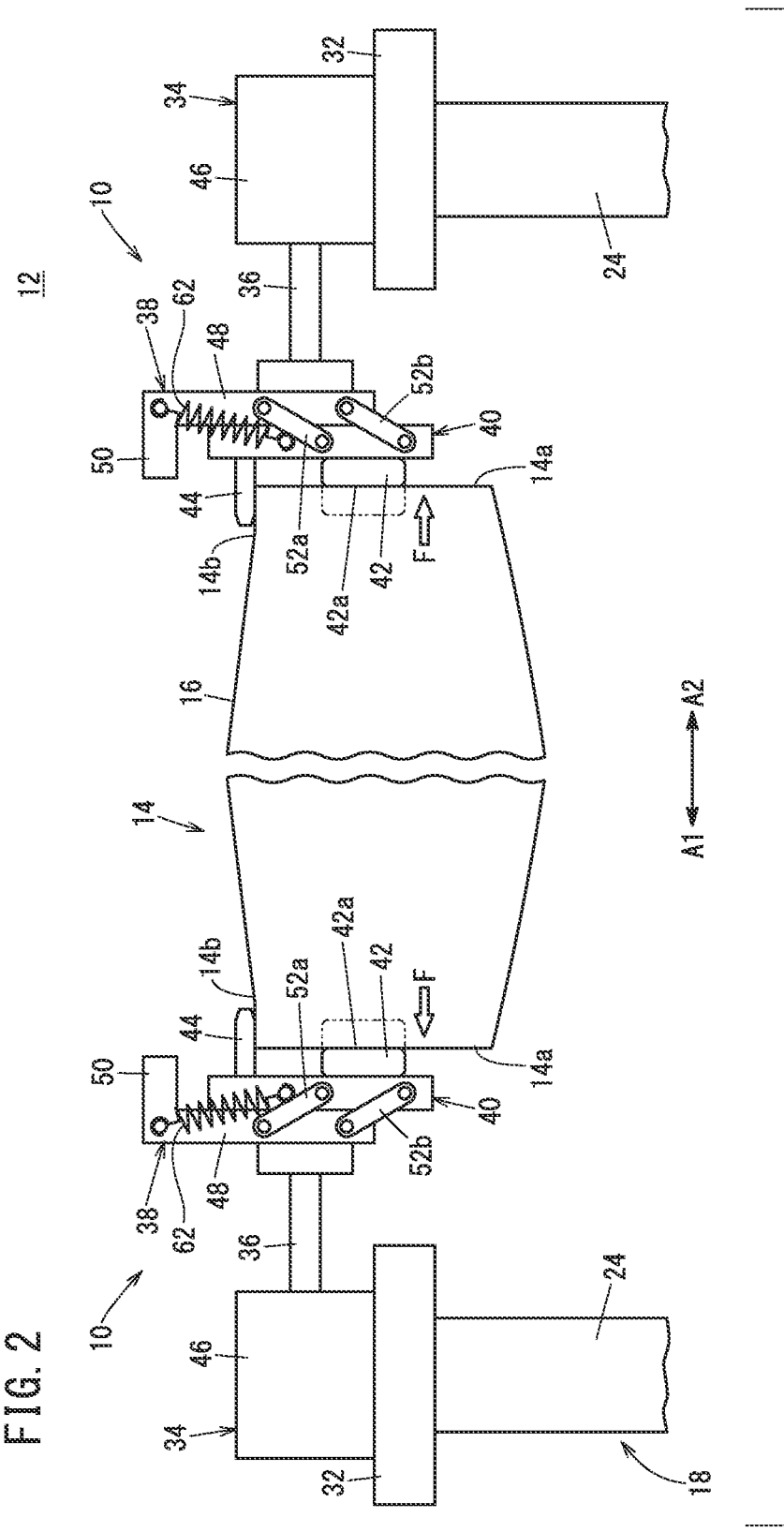
FIG. 2 is a partially omitted overall front view showing a state in which an instrument panel is clamped by the clamping device in the sewing apparatus of FIG. 1.

As shown in FIG. 6, the rod 36 of the cylinder 34 moves further toward the workpiece 14. With the movement of the movable plate 40, the end face 42a of the buffer member 42 abuts against the width-direction side surface 14a of the workpiece 14. As shown in FIGS. 2 and 3, the movable plate 40 moves further toward the workpiece 14. With the further movement of the movable plate 40, the buffer member 42 is compressed toward the workpiece 14 (see a two dot chain line in FIGS. 2 and 3).

As shown in FIG. 6, tips of the holding pins 44 are disposed at positions facing the upper portion 14b of the workpiece 14 in the up-down direction.

The end face 42a of the buffer member 42 abuts against the width-direction side surface 14a of the workpiece 14. Thus, the workpiece 14 is held in the width direction of the sewing apparatus 12 by the clamping devices 10 (clamped state, first clamping step).

Since the buffer member 42 is provided, generation of impact and impact noise when the clamping device 10 abuts against the workpiece 14 is suitably alleviated. The buffer member 42 is compressed toward the workpiece 14. Therefore, the buffer member 42 is pressed outward in the width direction (an arrow A1 direction in FIG. 6) by the workpiece 14. A reaction force F (see FIG. 3) directed outward in the width direction acts on the buffer member 42.

The movable plate 40 is pressed toward the base body 38 by the reaction force F acting on the buffer member 42. When the reaction force F overcomes the spring force of the spring 62, the movable plate 40 moves toward the base body 38 while tilting the two pairs of link arms 52a and 52b.

Specifically, the other ends 60 of the link arms 52a and 52b are tilted downward about the first support shafts 54. At this time, the movable plate 40 is supported by the two pairs of link arms 52a and 52b. Therefore, the movable plate 40 approaches the base body 38 while being substantially parallel to the base body 38. At this time, the movable plate 40 moves downward substantially parallel to the base body 38.

Thus, the buffer member 42 moves downward along with the movement of the movable plate 40 relative to the base body 38. The end face 42a of the buffer member 42 moves downward while sliding along the width-direction side surface 14a of the workpiece 14. As the movable plate 40 moves downward, the pair of holding pins 44 also move downward. As a result, each of the holding pins 44 comes into abutment against the upper portion 14b of the workpiece 14 and presses the upper portion 14b downward. In the clamping device 10, the workpiece 14 is maintained in a clamped state by the buffer member 42 and the holding pins 44 (second clamping step).

As a result, in the clamping device 10, the width-direction side surface 14a of the workpiece 14 is pressed toward the inner side of the workpiece 14 by the buffer member 42. At the same time, in the clamping device 10, the upper portion 14b of the workpiece 14 can be pressed downward and held by the pair of holding pins 44. That is, both ends of the workpiece 14 in the width direction are clamped in two directions, that is, in the width direction and from above, by the pair of clamping devices 10. Both ends of the workpiece 14 in the width direction are positioned and fixed by the respective clamping devices 10.

As shown in FIG. 1, a holding mechanism 82 is attached to the center of the base 22 in the width direction. The workpiece 14 is held by the pair of clamping devices 10, and at the same time, the center of the workpiece 14 in the width direction is held by the holding mechanism 82. Thus, the workpiece 14 is positioned and fixed to the base 22 at three locations (the pair of clamping devices 10 and the holding mechanism 82).

Next, the workpiece 14 held by the clamping devices 10 is sewn by the sewing mechanism 20.

First, as shown in FIG. 1, the sewing robot 68 operates under the control of the control unit 80. The sewing mechanism 20 attached to the tip of the sewing robot 68 approaches the workpiece 14. As the sewing mechanism 20 moves, the workpiece 14 is disposed between the post bed 66 and the sewing machine needle 76. Then, when the post bed 66 and the sewing machine needle 76 reach a position where sewing is to be performed, the lifting cylinders 26 are lowered by a control signal from the control unit 80. The inner jigs 28 attached to the lifting cylinders 26 are separated from the inner surface of the workpiece 14.

In the sewing apparatus 12, the plurality of inner jigs 28 are sequentially retracted downward according to the position of the sewing mechanism 20 in the width direction of the workpiece 14. As a result, the post bed 66 is disposed on the inner surface of the workpiece 14 and sewing is performed.

Next, the sewing motor 72 is driven based on a control signal from the control unit 80. As the sewing motor 72 is driven, the sewing machine needle 76 reciprocates up and down. As the sewing motor 72 is driven, the looper 74 rotates. As the looper 74 rotates, the thread 78 passed through the hole of the sewing machine needle 76 is pulled into the post bed 66.

While the sewing machine needle 76 reciprocates up and down, the tip arm 70 of the sewing robot 68 is moved to change the posture of the tip arm 70. Thus, the sewing mechanism 20 sequentially moves along the sewing line of the workpiece 14. Stitches in the form of stitch patterns are formed on the workpiece 14. Thus, the skin material 16 is sewn on the surface of the workpiece 14.

After the sewing of the skin material 16 on the surface of the workpiece 14 is completed, the clamped state of the workpiece 14 by the clamping devices 10 is released.

First, the compressed air supply source (not shown) is driven based on a control signal from the control unit 80. Compressed air is supplied from the compressed air supply source to the cylinder 34 of the clamping device 10. The rod 36 of the cylinder 34 is retracted by the compressed air in a direction away from the workpiece 14 (the arrow A1 direction, outward in the width direction in FIG. 6). In other words, the rod 36 moves toward the body 46.

When the rod 36 retracts, the base body 38 moves in a direction away from the workpiece 14 (the arrow A1 direction in FIG. 6). As the base body 38 retracts, the pressing force of the buffer member 42 toward the workpiece 14 is dissipated. As the compression of the buffer member 42 is released, the reaction force F applied from the buffer member 42 to the movable plate 40 decreases.

Accordingly, the movable plate 40 moves obliquely upward so as to be separated from the base body 38 by the spring force of the spring 62. As shown in FIG. 6, the holding pins 44 are lifted together with the movable plate 40, and the holding pins 44 are separated from the upper portion 14b of the workpiece 14. As a result, holding (clamping) of the upper portion 14b of the workpiece 14 by the holding pins 44 is released.

By supplying compressed air to the cylinder 34, the rod 36 and the base body 38 further retract. As shown in FIGS. 4 and 5, as the base body 38 retracts, the holding pins 44 move outward in the width direction from the workpiece 14. The holding pins 44 retract outward in the width direction from above the workpiece 14. In other words, when the workpiece 14 and the holding pins 44 in the sewing apparatus 12 are viewed vertically from above, the workpiece 14 and the holding pins 44 do not overlap each other. The end face 42a of the buffer member 42 is separated in the width direction from the width-direction side surface 14a of the workpiece 14.

Thus, holding (the clamped state) of the width-direction side surface 14a of the workpiece 14 by the movable plate 40 is also released. As a result, holding of the width-direction side surface 14a of the workpiece 14 by the clamping device 10 and holding of the upper portion 14b of the workpiece 14 by the clamping device 10 are both released. That is, the state in which clamping of the workpiece 14 by the clamping device 10 is released is established.

The workpiece 14 for which sewing has been completed is gripped by a conveying device (not shown) including a gripping mechanism (not shown). Thereafter, the workpiece 14 is lifted upward from the sewing apparatus 12 by the conveying device. The workpiece 14 is taken out from the sewing apparatus 12. The workpiece 14 to be sewn next is conveyed to the sewing apparatus 12 by the conveying mechanism. After the next workpiece 14 is positioned by the inner jigs 28, the workpiece 14 is held by the clamping devices 10 and is subjected to sewing.

When the clamping of the workpiece 14 is released, as illustrated in FIGS. 4 and 5, in the clamping device 10, the holding pins 44 do not overlap the workpiece 14 above the workpiece 14 on a movement line (see a two dot chain line) of the conveying device conveying the workpiece 14. The holding pins 44 retract outward in the width direction from the width-direction side surface 14a of the workpiece 14. Therefore, when the clamping device 10 conveys the workpiece 14 on which sewing has been performed, the holding pins 44 do not come into contact with the workpiece 14.

As described above, in the present embodiment, the sewing apparatus 12 for sewing the workpiece 14 of an automobile includes the clamping devices 10 that position and fix the workpiece 14 at a predetermined position on the base 22. The clamping devices 10 each include the cylinder 34, the base body 38, the movable plate 40, and the holding pins 44. The cylinder 34 includes the rod 36 that moves forward and backward relative to the workpiece 14. The base body 38 is attached to the distal end of the rod 36. The movable plate 40 is movably attached to the base body 38 via the two pairs of link arms 52a and 52b. The holding pins 44 are attached to the upper end of the movable plate 40.

One ends 58 of the two pairs of link arms 52a and 52b are pivotally supported by the base body 38 via the first support shafts 54. The other ends 60 of the two pairs of link arms 52a and 52b are pivotally supported by the movable plate 40 via the second support shafts 56. The buffer member 42 is mounted on the end face of the movable plate 40.

The buffer member 42 abuts against the width-direction side surface 14a of the workpiece 14 to hold the workpiece 14 in the width direction. Along with the abutment of the buffer member 42, the reaction force F from the buffer member 42 toward the movable plate 40 is generated. The movable plate 40 is pressed in a direction away from the workpiece 14 by the reaction force F.

As a result, the link arms 52a and 52b are tilted such that the other ends 60 approach the base body 38. As the link arms 52a and 52b are tilted, the movable plate 40 moves downward in a state of being substantially parallel to the base body 38. As a result, the holding pins 44 abut against the upper portion 14b of the workpiece 14 and hold the upper portion 14b from above. The upper portion 14b of the workpiece 14 is orthogonal to the width-direction side surface 14a of the workpiece 14.

One cylinder 34 is provided with the rod 36 moving forward and backward relative to the workpiece 14. By this forward and backward movement of the rod 36, the width-direction side surface 14a and the upper portion 14b of the workpiece 14 can be clamped and held by the movable plate 40 (the buffer member 42) and the holding pins 44.

The clamping devices 10 each include the movable plate 40 capable of abutting by moving downward and in the width direction simultaneously by driving force from the cylinder 34. Thus, the workpiece 14 can be simultaneously and reliably held by the clamping devices 10 from two directions, that is, in the width direction and from above. The manufacturing cost can be reduced by simplifying the configuration of the clamping devices 10.

The movable plate 40 has the end face facing the width-direction side surface 14a of the workpiece 14. The buffer member 42 made of an elastic material is mounted on the end face of the movable plate 40. The buffer member 42 is brought into abutment against the width-direction side surface 14a of the workpiece 14. Thus, when the movable plate 40 is lowered to bring the holding pins 44 into abutment against the upper portion 14b of the workpiece 14 in a state where the buffer member 42 is in abutment against the width-direction side surface 14a of the workpiece 14, the buffer member 42 is prevented from sliding along the width-direction side surface 14a. Therefore, it is possible to prevent the width-direction side surface 14a of the workpiece 14 from being damaged.

The spring 62 serving as a resilient member is interposed between the protruding portion 50 of the base body 38 and the movable plate 40. When the holding pins 44 is in abutment against the upper portion 14b of the workpiece 14 and is clamping the upper portion 14b, the spring force of the spring 62 bias the holding pins 44 away from the workpiece 14.

Therefore, when the clamped state of the workpiece 14 by the clamping device 10 is released, the rod 36 of the cylinder 34 is retracted in a direction away from the workpiece 14. By the retraction of the rod 36, the holding pins 44 can be quickly separated upward from the workpiece 14 by the spring force of the spring 62, and the clamped state of the workpiece 14 can be released.

The clamping devices 10 described above are used when the sewing apparatus 12 performs sewing on an instrument panel, which is the workpiece 14 mounted on an automobile. The workpiece 14 can be clamped by moving the cylinder 34 forward and backward along the width direction of the workpiece 14 that is the vehicle width direction of the automobile when the workpiece 14 is mounted on the automobile. For example, even when the workpiece 14, which is a molded article made of a resin material, has variations in shape, sewing can be performed on the workpiece 14 by reliably clamping the workpiece 14 by the pair of clamping devices 10 in accordance with the variations in shape.

The above embodiment can be summarized as follows.

The above embodiment relates to a clamping device (10) that positions and fixes a workpiece (14), the clamping device comprising: a cylinder (34) configured to move forward and backward relative to the workpiece; a base body (38) attached to a tip of the cylinder; a first clamping member (40) attached to the base body substantially parallel to the base body via at least one pair of link arms (52a, 52b), the first clamping member including an abutting surface (42a) configured to abut against a first surface (14a) of the workpiece in an operating direction of the cylinder; and a second clamping member (44) attached to the first clamping member and extending in a direction orthogonal to the abutting surface, wherein one end (58) of each of the link arms is pivotally supported by the base body, and another end (60) of each of the link arms is pivotally supported by the first clamping member, and when the first clamping member abuts against the workpiece and each of the link arms is tilted in a manner that the another end approaches the base body, the second clamping member moves in a direction orthogonal to the operating direction and abuts against a second surface (14b) of the workpiece that is substantially orthogonal to the first surface.

The abutting surface includes a buffer member (42) having elasticity and configured to abut against the workpiece.

The clamping device further comprises a resilient member (62) between the base body and the first clamping member, and the resilient member biases the second clamping member in a direction away from the workpiece when the second clamping member is in abutment against the workpiece.

The workpiece is an instrument panel of an automobile, and the cylinder moves forward and backward along a width direction of the instrument panel, the width direction corresponding to a vehicle width direction when the instrument panel is mounted on the automobile.

The clamping device includes a base body, a first clamping member attached to the base body substantially in parallel to the base body via a link arm, and a second clamping member attached to the first clamping member and extending in a direction orthogonal to an abutting surface configured to abut against the workpiece, and the workpiece clamping method comprises: a first clamping step of causing the first clamping member to abut against a first surface of the workpiece to thereby move the link arm in a direction allowing the second clamping member to abut against the workpiece; and a second clamping step of causing the second clamping member to abut against a second surface of the workpiece that is substantially orthogonal to the first surface, by moving the link arm.

Note that the present invention is not limited to the embodiment described above, and various configurations can be adopted therein without departing from the gist of the present invention.

What is claimed is:

1. A clamping device that positions and fixes a workpiece, the clamping device comprising:
   a cylinder configured to move forward and backward relative to the workpiece;
   a base body attached to a tip of the cylinder;
   a first clamping member attached to the base body substantially parallel to the base body via at least one pair of link arms, the first clamping member including an abutting surface configured to abut against a first surface of the workpiece in an operating direction of the cylinder; and
   a second clamping member attached to the first clamping member and extending in a direction orthogonal to the abutting surface, wherein
   one end of each of the link arms is pivotally supported by the base body, and another end of each of the link arms is pivotally supported by the first clamping member, and
   when the first clamping member abuts against the workpiece and each of the link arms is tilted in a manner that the another end approaches the base body, the second clamping member moves in a direction orthogonal to the operating direction and abuts against a second surface of the workpiece that is substantially orthogonal to the first surface.

2. The clamping device according to claim 1, wherein the abutting surface includes a buffer member having elasticity and configured to abut against the workpiece.

3. The clamping device according to claim 1, further comprising a resilient member between the base body and the first clamping member, wherein
   the resilient member biases the second clamping member in a direction away from the workpiece when the second clamping member is in abutment against the workpiece.

4. The clamping device according to claim 1, wherein the workpiece is an instrument panel of an automobile, and the cylinder moves forward and backward along a width direction of the instrument panel, the width direction corresponding to a vehicle width direction when the instrument panel is mounted on the automobile.

* * * * *